United States Patent [19]

Sharon

[11] Patent Number: 4,550,497
[45] Date of Patent: Nov. 5, 1985

[54] TOOL TO PRODUCE A NEW ANGLE ON A FAN BLADE

[75] Inventor: Harold M. Sharon, Glastonbury, Conn.

[73] Assignee: United Technologies Corporation, Hartford, Conn.

[21] Appl. No.: 558,135

[22] Filed: Dec. 5, 1983

Related U.S. Application Data

[63] Continuation-in-part of Ser. No. 322,097, Nov. 16, 1981, abandoned.

[51] Int. Cl.⁴ ............................................. B23D 79/08
[52] U.S. Cl. ................................ 30/169; 29/156.8 B; 29/402.06
[58] Field of Search .................. 30/294, 169, 171; 51/173, 170 TL; 76/82, 82.1, 82.2, 83, 86, 88, 89; 29/156.8 B, 402.06

[56] References Cited

U.S. PATENT DOCUMENTS

| | | | |
|---|---|---|---|
| 554,116 | 2/1896 | Ford | 51/285 |
| 1,790,213 | 1/1931 | Gwaltney | 29/156.8 P |
| 2,741,164 | 4/1956 | Smedley | 409/293 |
| 2,897,640 | 8/1959 | Hermann | 51/173 |
| 2,993,312 | 7/1961 | Holland | 51/173 X |
| 3,184,833 | 5/1965 | Zeidler | 29/156.8 FC |
| 3,192,835 | 7/1965 | Leibinger | 409/303 |
| 3,641,874 | 2/1972 | Rick | 409/303 |
| 3,826,159 | 7/1974 | Otto | 76/82 |

FOREIGN PATENT DOCUMENTS 686807 1/1953 United Kingdom ............ 416/223 R

Primary Examiner—Jimmy C. Peters
Attorney, Agent, or Firm—Charles A. Warren

[57] ABSTRACT

Cutting tools for shaping or reshaping the airfoil edge of a blade of a gas turbine engine to produce a uniform blade leading edge shape on the operative portion of the blade.

4 Claims, 7 Drawing Figures

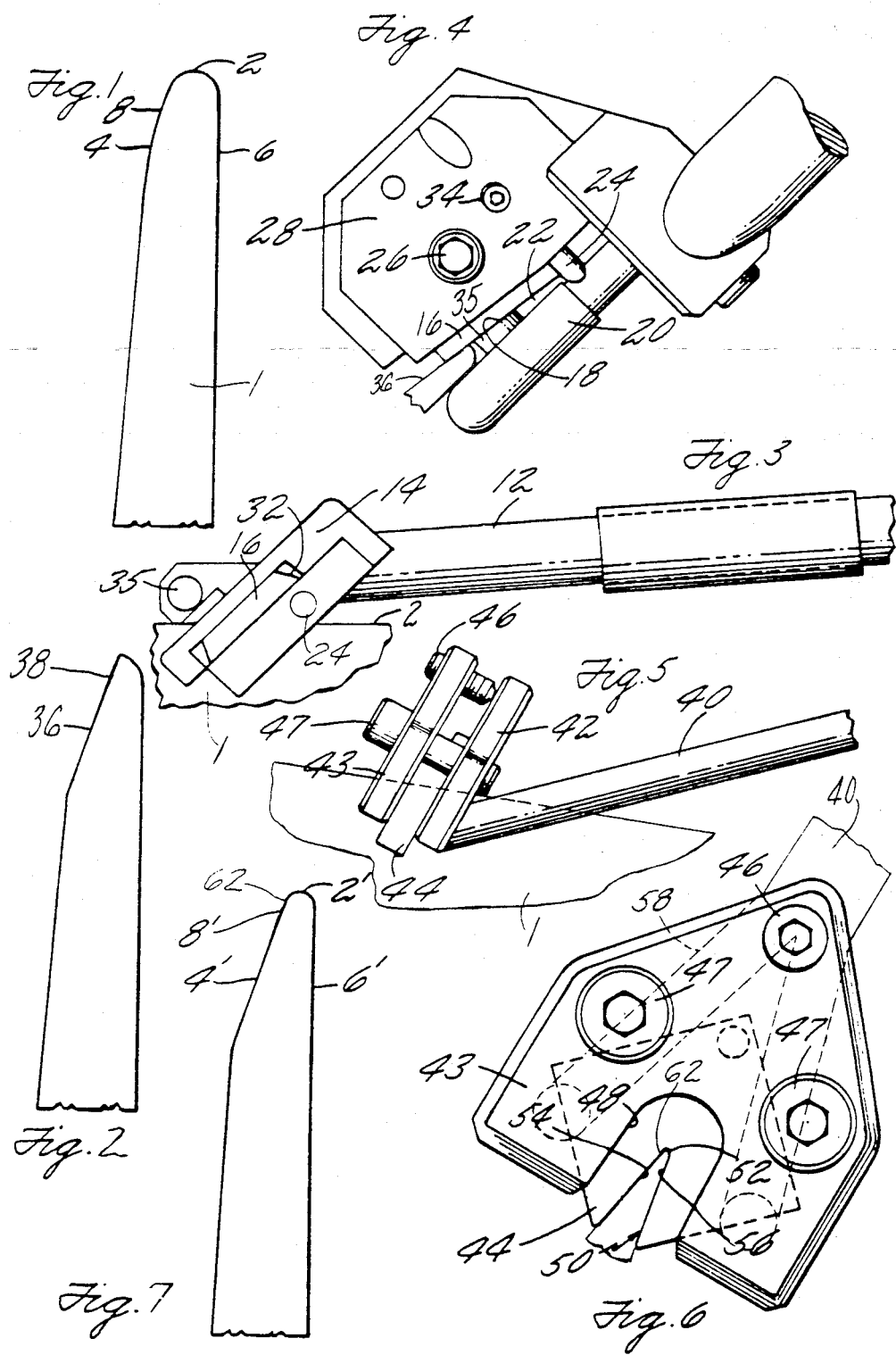

4,550,497

TOOL TO PRODUCE A NEW ANGLE ON A FAN BLADE

CROSS REFERENCE TO RELATED APPLICATION

This is a Continuation-in-Part of application Ser. No. 322,097, filed on Nov. 16, 1981, now abandoned.

TECHNICAL FIELD

This invention relates to cutting tools for reshaping the airfoil edge of a blade or vane particularly the fan blade for a gas turbine engine.

BACKGROUND ART

It has become well known that the fan efficiency is dependent to a great extent on the airfoil shape of the fan and particularly on the shape of the leading edge of the airfoil. Recent studies have indicated that a thinner and well rounded leading edge will significantly improve the fan performance and efficiency. Routinely this would be accomplished by reworking the fan in an overhaul shop or by returning the fan to the manufacturer for establishing a desired new configuration. It is desirable to form this leading edge without the need for returning the blade to the manufacturer for a complete reshaping. Instead it is hoped that the leading edge can be reshaped in the field without any significant downtime for the engine.

Also in the manufacture of new blades no two blades are precisely alike in shape and it is thus impossible to machine the leading edges of the blades to the precise dimensions and contours desired by cams or computer controlled machines. They must be handcrafted to the precision desired and suitable tools for hand forming this edge are needed. Such tools would also have use in refurbishing the blade after a period of use in which the normal wear and tear erosion spoils the shape of the leading edge.

DISCLOSURE OF INVENTION

A feature of the invention is a set of cutting tools with which to manually rework the edge of the blade to the desired new thinness and to establish an aerodynamically rounded contour for the edge.

Another feature is the process by which the edge may be worked in two steps to produce the new thin contour desired.

Another feature is the inclusion of limiting means in the cutting tools to ensure the reshaping of the edge to the desired contour within acceptable limits.

According to the invention the edge of the blade or vane is cut to size by a two step process in which the first step involves cutting one side surface of the blade adjacent to the radius of the edge with a first cutting tool to establish the desired relation of the side surfaces of the blade to the chord of the blade and to establish the desired blade thickness at and near the leading edge and the second step involves cutting the leading edge and a very short distance back on each side of the blade by using a second tool to create the desired radius or curvature at the edge and to blend this curvature to the side surfaces of the blade closely adjacent to the leading edge. These tools may be carbide tool bits in suitable holders which ensure the proper cutting action with respect to the chord of the blade.

The foregoing and other objects, features and advantages of the present invention will become more apparent in the light of the following detailed description of the preferred embodiments thereof as shown in the accompanying drawing.

BRIEF DESCRIPTION OF THE DRAWING

FIG. 1 is a sectional view showing the original contour of the leading edge.

FIG. 2 is a sectional view as in FIG. 1 showing the new thinner contour after the completion of the first cutting operation.

FIG. 3 is a side view of the first tool and holder used in position on the blade.

FIG. 4 is a plan view showing the location of the cutting tool in this holder.

FIG. 5 is a side view of the second tool holder.

FIG. 6 is a plan view showing the location of the cutting tool in the second holder.

FIG. 7 is an enlarged view of the completed blade edge after the second cutting operation.

BEST MODE FOR CARRYING OUT THE INVENTION

Referring first to FIG. 1 the original leading edge of the fan blade 1 is relatively thick and has a leading edge curvature 2 that blends with the opposite surfaces 4 and 6 of the blade adjacent to the leading edge. The leading edge thickness may be about 0.050 inch at the point 8 on the blade. A preferred leading edge contour is shown in FIG. 7 where the leading edge 2' has a curvature necessarily on a smaller radius, and the thickness between the opposite surfaces 4' and 6' at the point 8' may be about 0.030 inch.

The present invention is directed to tools for reshaping the leading edge to such a contour as that of FIG. 7 and to a process that makes it possible to do this shaping in the field.

To accomplish this the leading edge of the airfoil 1 is worked on successively by two tools, the first one cutting only one surface of the blade adjacent to the leading edge and the second tool cutting the leading edge to the desired contour and possibly either or both surfaces closely adjacent thereto to blend with the leading edge curvature.

The first tool as shown in FIG. 3 has a handle 12 to the end of which is fastened a mounting block 14 in which is supported a carbide tool bit 16 having a cutting edge 18 (FIG. 4). A pin 20 is also supported in the block. The pin and the cutting edge make an angle of about 140° to the handle as shown and also make an angle of about 14° to one another in the mounting block. The cutting edge of the tool and the centerline of the pin 20 are in the same plane as shown. Although the angle 14° is given for a particular tool it will be understood that this angle is in fact set to conform to the desired angle between the opposed fan blade surfaces adjacent the leading edge. This angle may vary depending upon the particular blade being operated on. One fan blade for example that has been treated by a device of this character had an angle of 14° between the opposed surfaces and thus the tool angle is set at 10° when viewed normal to the cutting face. The tool angle is less than the blade angle since the tool is used at an angle to the blade edge as shown in FIG. 3. At the upper end of the notch 22 formed between the tool bit and the pin is a second or limiting pin 24 substantially at right angle to the pin 20 and in a position to limit the edge of the fan blade as it enters the slot and is operated on by the tool. Set screw 34 retains the pin 24 in position.

The tool bit is removable by releasing a clamping screw 26 extending through a clamping block 28. This block has a recess 32 to accept the tool bit. In use the tool is held against the edge of the blade with the handle at an angle of about 5° to the edge and with the blade edge in the tool notch as shown in FIGS. 3 and 4. This allows the user to hold the handle without hitting his hands against the blade. This in effect makes a cutting angle for the tool bit of about 135° to the blade edge or about 45° perpendicular to this edge and this is enough to permit good cutting action on the side of the blade being cut and also to allow the tool to ride over portions of the blade edge that may be slightly thicker. The trailing pin 35 is in a position to engage the leading edge of the blade if the handle is raised to form too high an angle with the leading edge. This limits the cutting action to the desired angle. Cutting with this tool is continued until the leading edge is in contact with the pin 24 during cutting action on the entire length of the fan blade. The result is a fan blade shape as shown in FIG. 2 with the flat surface 36 formed on the side of the blade and with a thinner profile at this edge. The purpose of this first cut is to produce the desired leading edge thickness for the newly shaped blade, the angle at the leading edge being determined by the angle between the cutting edge 18 and the pin 20, as modified by the angle at which the handle is held. The result is for example a blade with an angle of 14° and a thickness at the point 38 of 0.030".

The edge of the blade is then further shaped by the second cutting tool. This tool as shown in FIGS. 5 and 6 has a handle 40 to the end of which is attached a mounting block 42. This block has a coverplate 43 defining with the block a slot to receive therein a tool bit 44 which is clamped by bolts 47 acting against a set screw 46 to hold the plate against the tool bit. The block and plate have notches 48 therein to expose the cutting edge of the tool bit as shown. The mounting block in this arrangement is at about 130° to the axis of the handle for the same purpose as in the first tool. This tool is found to cut best at this angle.

The cutting tool bit in this case is differently shaped. It has a V notch 50 therein terminating in the curvature 52 desired for the edge of the blade and this portion of the tool bit is sharpened to produce this shape on the blade edge. The opposite sides 54 and 56 of the notch extending from the base curvature are not formed as cutting surfaces but are ground so as not to perform a cutting action but only to ride on the opposite sides of the blade to locate the tool bit properly with respect to the chord of the blade. The angle between the sides 54 and 56 is slightly greater than the angle of the blade so as to provide a small clearance so that the tool will not bind. The opposite sides 54 and 56 may have cutting edges for a very short distance from the leading edge curvature to assure blending of the curvature to the side surfaces.

The handle is divided near the mounting block to form two legs 58 to straddle the edge of the workpiece during use of the tool. As shown, these legs are attached to the mounting block at opposite sides of the tool bit and thus do not interfere with the cutting action of the tool bit when the tool is in use.

When the tool is in use it functions in the same manner as the first tool. The cutting edges produce the desired leading edge curvature 2' on the blade and blend this curvature to the desired angle of the opposed blade surfaces 4' and 6' closely adjacent to the leading edge. The edges of the tool bit ride on the sides of the blade and assure the proper relation of the curvature on the leading edge of the blade to the chord of the blade. The portion of the cutting edge 54 that is below the point 62 rides on the surface 36 of the blade and guides the cutting action of the tool.

These tools are utilized in carrying out the process of the invention which essentially includes cutting back one side surface of the blade for a distance back from the leading edge to form the desired angle and thickness between the opposed blade surfaces and subsequently with the second tool cutting the leading edge itself to form the desired contour. It has been found that by practicing this process it is possible to reshape the blade so that it will have the desired curvature on the leading edge and the desired thickness of the blade adjacent to the leading edge that will provide significantly better performance of the blade in use.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A cutting tool for use in producing a new angle for the opposite sides of a fan blade at a point closely spaced from the leading edge including:

a mounting block;

a handle extending from said mounting block;

a tool bit secured in said block and having an exposed cutting edge;

a pin in said block in the same plane as the cutting edge and spaced therefrom forming a notch with said cutting edge and making the desired blade edge angle with the cutting edge with the blade edge positioned between said cutting edge and pin, said cutting edge and pin extending at an obtuse angle to the handle; and means adjacent the base of the notch to engage the blade edge for limiting the depth of movement of the blade edge into said notch, the blade thus cutting one side surface of the blade adjacent the edge.

2. A cutting tool as in claim 1 in which the block has clamping means for releasably holding the tool bit in position.

3. A current tool as in claim 1 which the limiting means is a second pin at a substantially by a right angle to the first pin and located at the base of the notch.

4. A cutting tool as in claim 1 which the angle of the handle with the mounting block is such as to position the cutting edge of the tool at an angle of about 135° to the blade edge.

* * * * *